ic Patent [19] [11] 4,054,124
Knoos [45] Oct. 18, 1977

[54] SOLAR RADIATION COLLECTION SYSTEM

[76] Inventor: Stellan Knoos, 1746 Manzanita Park Ave., Malibu, Calif. 90265

[21] Appl. No.: 674,309

[22] Filed: Apr. 6, 1976

[51] Int. Cl.² .................................................. F24J 3/02
[52] U.S. Cl. ........................................................... 126/270
[58] Field of Search ................................. 126/270, 271

[56] References Cited

U.S. PATENT DOCUMENTS

| 2,366,184 | 1/1945 | Dean | 126/271 |
| 3,939,818 | 2/1976 | Hamilton et al. | 126/270 |
| 3,957,109 | 5/1976 | Worthington | 126/271 |
| 3,987,782 | 10/1976 | Meier, Jr. | 126/271 |

*Primary Examiner*—Lloyd L. King
*Attorney, Agent, or Firm*—Fraser and Bogucki

[57] ABSTRACT

High efficiency solar radiation collectors may employ a dual flow path relative to heat transfer surfaces of the collector panel. A major air flow is confined beneath the panel, but a subsidiary (bypass) air flow at an angle to the principal air flow is also employed to suppress natural (free) flow convection at an upper side of the panel. Advantageously, the subsidiary air flow can be established by perforations in the collector panel and by creation of a suction for the bypass air. High efficiency energy collection, particularly adapted to weak and intermittent radiation environments, is further enhanced by the usage of a collector panel having a low thermal mass and providing good thermal interchange with a relatively small air mass moving beneath and above the panel, while being arranged to limit thermal conduction along the panel in the direction of air flow. Thus, a thermal gradient is established along the length of the collector panel, with a low temperature differential with the heated air mass at every position, with a fast heating response time, and with reradiation losses being minimized. By recirculating the air in a low thermal mass heat exchange system with an energy storage system in such fashion that inlet fluid is at the lowest sustainable temperature, insolation incident upon the collector is more fully utilized. The thermal energy storage most advantageously comprises what may be termed a minimum entropy system, with thermal energy in the heated air mass being interchanged in counterflow relation with a storage fluid which may be fed to different temperature level storages, dependent upon the intensity of the solar radiation available to the collector.

49 Claims, 13 Drawing Figures

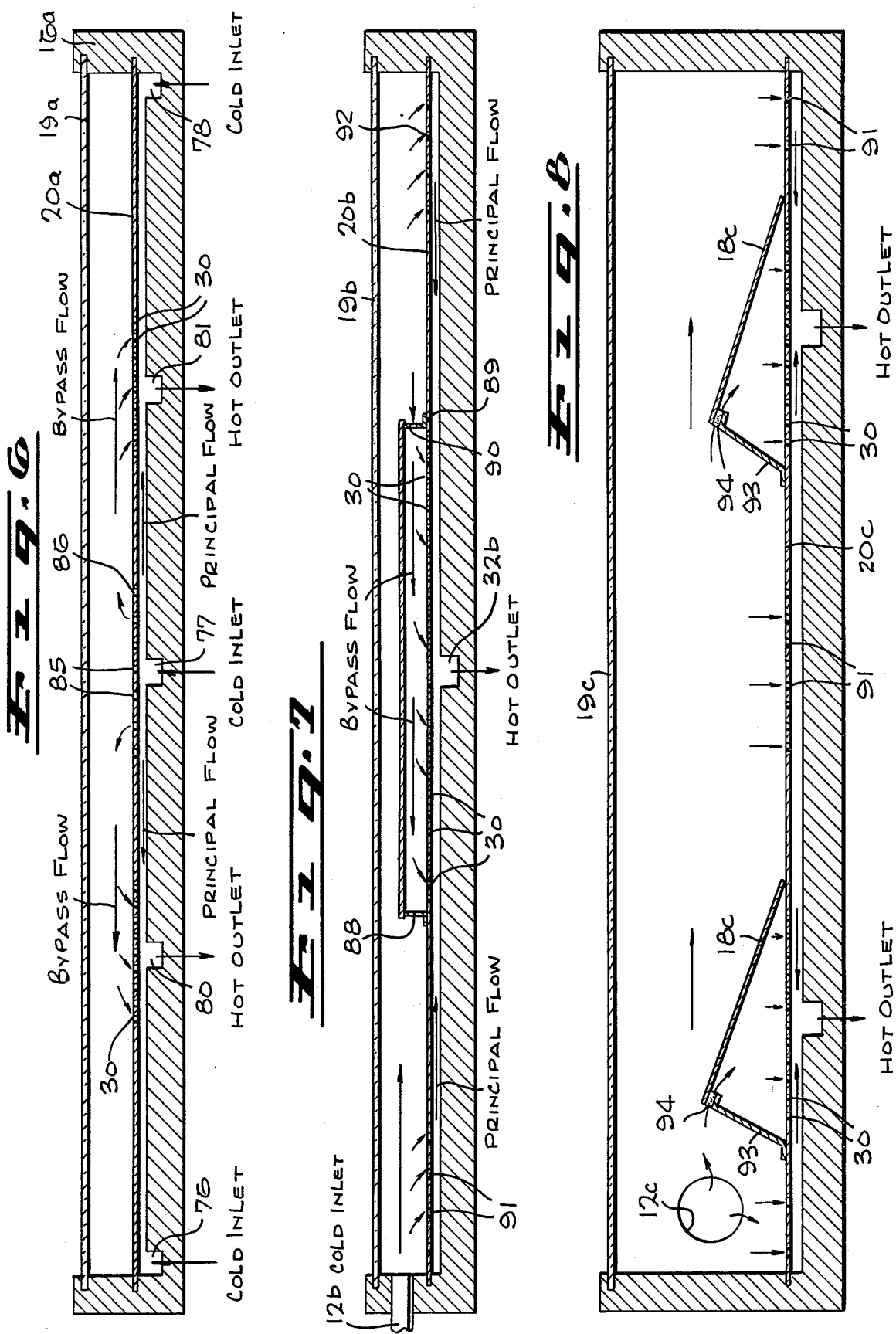

SOLAR RADIATION COLLECTION SYSTEM

BACKGROUND OF THE INVENTION

With the general recognition of the existence of finite limitations to the availability of petrochemical and other sources of fuel, much attention has been directed to the utilization of solar energy for heating, cooling and other purposes. The patent literature contains numerous references to specific systems, while the scientific literature, which is now much greater in volume, has largely been concerned with the more conceptual and theoretical aspects of such systems but now evidences many experimental installations. A recent article entitled "Solar Heating and Cooling," by J. A. Duffie and W. A. Beckman, published in *Science*, pp. 143-149, Volume 191, Number 4223, Jan. 16, 1976, evidences the current state of the art in many respects and provides a useful bibliography. The same authors have also published a text, "Solar Energy Thermal Processes" (Wiley, New York, 1974) which is more comprehensive in nature and widely employed by workers in the art.

In the referenced article, Duffie and Beckman discuss the solar air heater and solar water heater systems which are principally used for collection, and the thermal energy storage systems (pebble bed and water storage tank respectively) which are usually employed with them, and point out that the water heater type of system is predominantly used. The water heater system can of course present freezing and boiling problems; because of the need for piping to conduct the liquid and for a good thermal interchange between the collector and the liquid in the conduit, collectors for solar water heater systems are substantially more expensive than those for air heater systems. Both types of systems use radiant energy transmissive cover panels, generally referred to as glass covers, and an insulative structure at the back and edges of the plates. As indicated in the article solar energy collection can also be used in a cooling system, although an additional thermodynamic process is needed.

Beckman and Duffie give a generalized equation often used to define the useful gain of a collector, which is determined by flow rate, temperature gradients, absorbed radiation, angle of incidence of the solar energy, the number of covers, the properties of the collector plate and the covers, and a number of other factors. They point out that an increase in collector temperature causes an increase in thermal loss that diminishes collector output, as it approaches the absorbed radiation. They do not discuss another very significant element of thermal loss which arises from natural (free) convection losses caused by the heating of the light incident upper side of the collector plate. More than 70 years ago it was shown that cellular recirculation of gases on the surface of the collector plate could arise, substantially intensifying convection losses should this condition exist. These so-called "cells of Bénard" have subsequently been studied in much more detail, and various schemes have been devised for minimizing or suppressing this effect. The proposed techniques include the use of an open honeycomb type of structure and multiple planar absorber elements geometrically arranged to inhibit generation of the cellular action. Such expedients, however, materially increase collector panel costs and introduce other, if relatively lesser, losses in the system.

A number of other expedients for improving collector efficiency are mentioned in the referenced article, including the usage of selective, low emissivity, surfaces and the employment of a vacuum in at least one interior volume within the collector structure. The former expedient may advantageously be used with most collector systems, including the presently disclosed system; the latter expedient presents economic and maintenance penalties that should be avoided if at all possible.

The factors represented in the thermal mass calculations given by Duffie and Beckman do not include a term for the significance of the thermal mass of the system, but it is obvious that the time delays encountered in heating the collector system (or what may be called the thermal capacitance of the system) can be of primary importance in environments in which the incident solar radiation is weak, intermittent or both. Thus in a geographical area at high latitude the thermal capacitance of a solar water heater may not be acceptable. Typically, for such a system, the thermal mass of the collector plate requires approximately 5 minutes for heating to a 50° C. temperature differential above ambient, and another 15 minutes is required for heating of the water mass. In addition, solar energy systems used at low latitudes are particularly subject to high wind losses and low ambient temperature conditions. The usual approach of adding additional glass covers does decrease heat loss but at the penalty of substantial attenuation and reflection of the radiant energy. It would be far preferable to be able to reduce the thermal capacitance while at the same time minimizing the number of glass covers and avoiding introduction of a sealed vacuum system.

SUMMARY OF THE INVENTION

Systems in accordance with the invention utilize a number of novel and mutually cooperative features, at least some of which have independent utility. An important aspect of the present invention is the suppression of natural convection losses by the utilization of dual flow paths, with a principal flow path being along the under side of the collector panel. A bypass or suction flow is established across the face of the collector panel, this being most readily achieved by spatially distributed apertures in the collector panel itself. Advantageously, the bypass flow is from 25-75% of the flow in the system.

Although the dual flow technique is also applicable to water heating type of systems, it is advantageously used with air heaters and is described in that context, because of other interrelated features and benefits. A thin collector panel of low thermal mass having a small spacing from the insulative backing plate comprises another important feature of the system. A low mass, laminar, air flow in intimate thermal exchange relation with the heated collector panel thus moves along the under side of the panel. The heat transfer characteristics of the panel may be said to be anisotropic, in the sense that thermal energy is more effectively transferred to the associated air mass then along the panel itself, so that a temperature gradient exists along the flow direction. Further, there is only a small temperature differential between the air mass below the panel and the collector panel at any position along the direction of flow, with the maximum temperature being achieved at the outlet region of the collector plate. Although the dual path flow introduces some distortion of the temperature gradient along the collector panel compared to single path flow, the arrangement provides not only suppression of free convection losses, but a very short time constant in the conversion of radiant energy to thermal energy, while minimizing re-radiation losses. At the same time, what may be termed a minimum entropy energy storage system is arranged in a cooperative fashion to take advantage of the high efficiency operation. A low thermal mass, high efficiency countercurrent heat exchanger is employed to interchange heat between the heated air and a liquid (e.g. water). At least one temperature at the heat exchanger is sensed and used to control passage of the heated liquid into one of several individual but interconnected insulated storage reservoirs, each being assigned a different level in a hierarchy of temperatures. Wherever it is injected into this hierarchial storage system the water continues to be recirculated through the heat exchanger using the lowest temperature water as input. Thus the air recirculated in the solar energy collection system is always injected at the lowest sustainable input temperature, so that system efficiency is kept high. At the same time the heated air cannot encounter a higher temperature liquid.

In consequence of these interrelated features, the impingement of weak or intermittent insolation upon the collector panel system is utilized with an efficiency which has not heretofore been approached. Different exemplifications of this system are described which are readily fabricated at low cost. A thin collector panel of a thickness of up to the order of 0.5 mm, is disposed at a spacing of 3 mm or less from an insulative back structure, and may be fronted in conventional fashion by a single or double glass panel. In one specific example of a collector panel system, inlet air flows between a pair of glass (or plastic) covers, around the longitudinal side edges of the collector panel, and transversely relative to the side edges to a central outlet conduit which may be formed directly in the insulative back plate. The bypass flow path is directed between the upper side of the collector panel and the under side of the adjacent glass cover, before flowing through the apertures in the collector panel to join the principal under side flow. Advantageously, the bypass apertures are spatially distributed asymmetrically relative to the collector panel, i.e. only throughout the hotter section of the panel where the need for suppression of free convection is greatest. Advantageously also, a restriction is placed in the flow path of the bypass flow, such that an appropriate pressure differential between the bypass flow and the principal flow is obtained, to give a more readily controlled suction effect and to permit larger apertures to be used for better freedom from clogging. A number of other examples are shown, demonstrating that bypass flow can be established by causing a portion of the principal flow to be diverted upwardly through larger apertures in the collector plate itself and then returned downwardly through the bypass apertures to the under side of the collector panel. Also a substantial saving in glass or other cover material costs can be effected by using an interior panel which covers only a part of the area of the collector panel, and which may be tilted to provide better light transmission, as well as suppression of free convection and trapping of heat.

These and other features may also be utilized in conjunction with other means for suppressing free convection, such as the honeycomb structures that are now in use. Further they may be used with solar concentrators employing collector panel concavities, light concentrating lens structures, and with collector structures using an array of glass tubes above the collector surface.

BRIEF DESCRIPTION OF THE DRAWINGS

A better understanding of the invention may be had by reference to the following description, taken in conjunction with the accompanying drawings, in which:

FIG. 6 is a side sectional view of a different arrangement of the collector panel structure in accordance with the invention;

FIG. 7 is a side sectional view of still another collector panel structure in accordance with the invention;

FIG. 8 is a side sectional view of yet another collector panel structure in accordance with the invention;

DETAILED DESCRIPTION OF THE INVENTION

Figure 1:
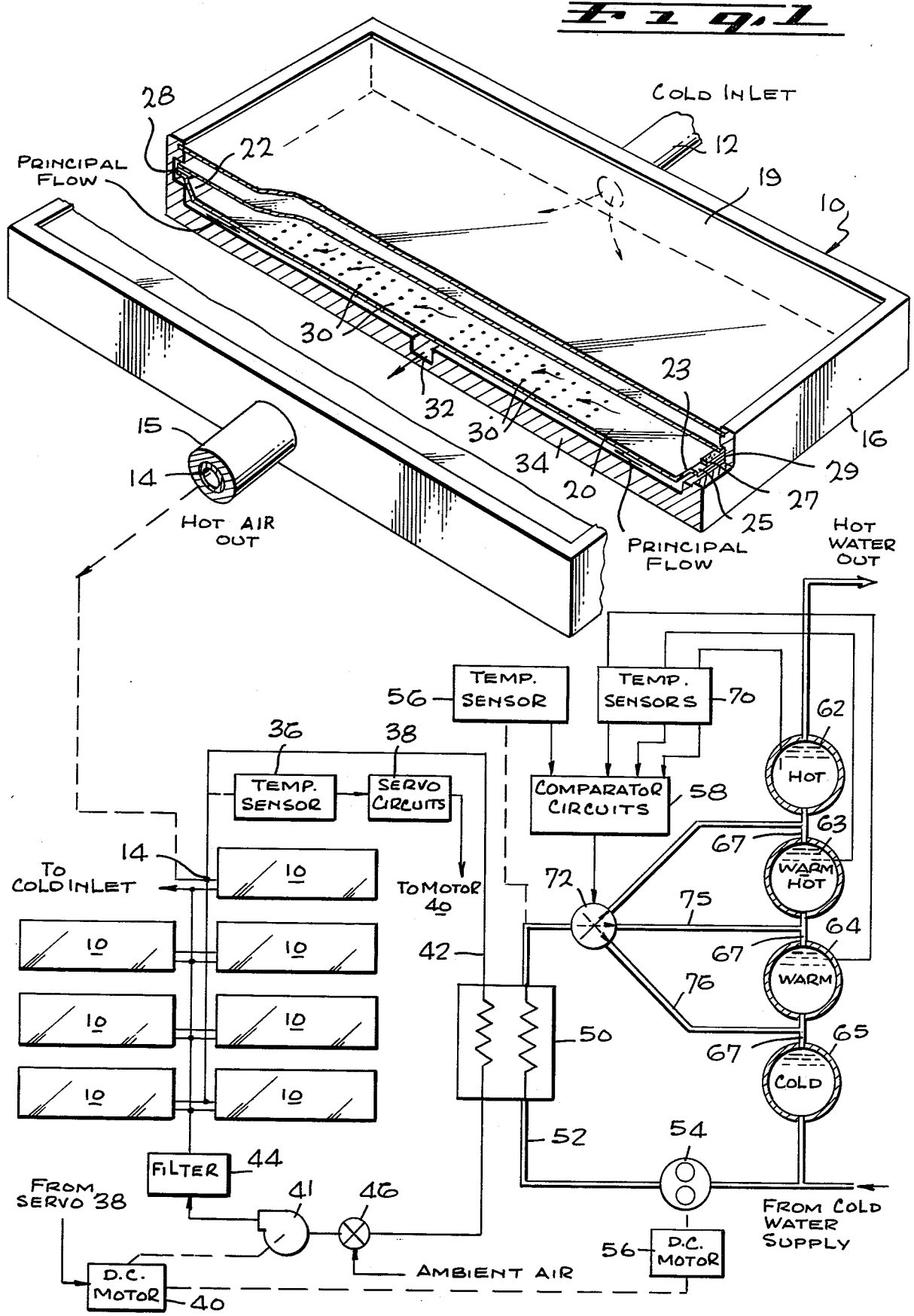
FIG. 1 is a combined block diagram and broken away perspective view, in simplified form and not to scale, of one example of a system in accordance with the invention.
Figure 2:
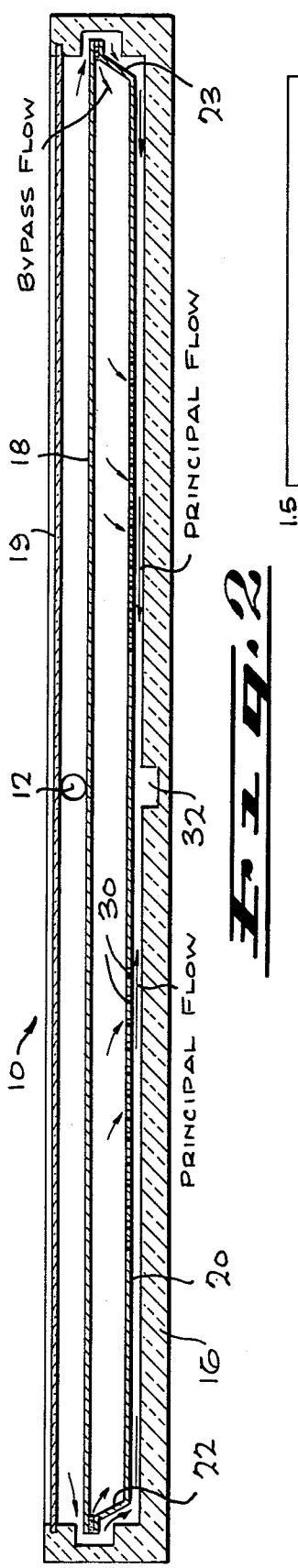
FIG. 2 is a side sectional view of the collector panel structure of the arrangment of FIG. 1.
Figure 3:
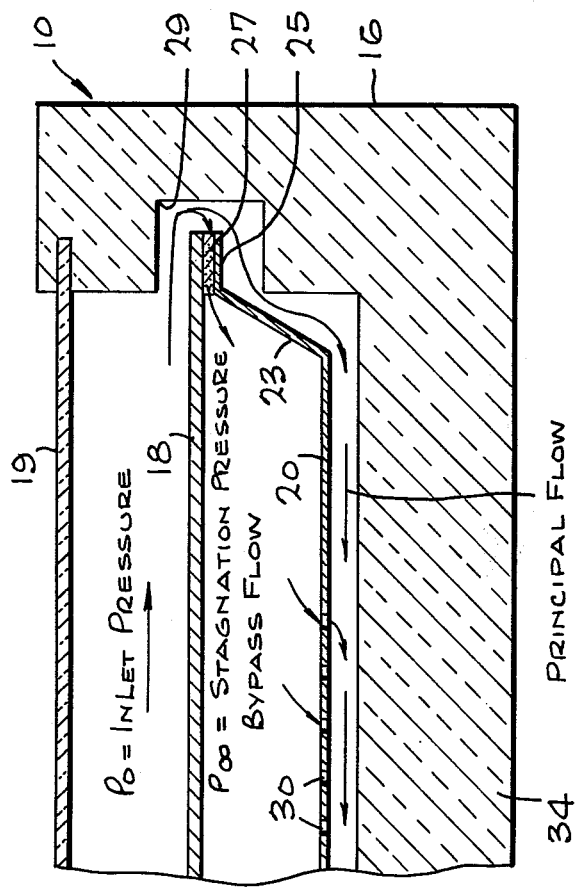
FIG. 3 is an enlarged side fragmentary view of the arrangement of FIG. 2, utilized in the description thereof.

A solar energy collection system in accordance with the invention is depicted generallly in FIGS. 1-3, although only one collector structure 10 is shown in detail for simplicity. As employed herein, the terms "solar energy," "radiant energy" and "insolation" are each intended to refer to those portions of the electromagnetic wave energy spectrum (whether direct or diffuse, within or outside the visible range) emanating from the sun and which may be converted by absorption to thermal energy. Although a given number of collectors 10 of rectangular shape are shown, it is evident that the number, size and shape of the structures used can vary widely; similarly it will be understood that the structures can be mounted with adjustable tilt angles and direction, or can be operated in a tracking mode. Within an individual collector 10, intake or cold air is received at an inlet conduit 12, and injected into the panel interior, while hot air is extracted at an outlet conduit 14 having adequate insulation 15. The terms "cold" and "hot," while obviously relative, here connote either the ambient or lowest sustainable recirculating air temperature on the one hand, and the radiant energy heated air, whatever the final temperature reached, on the other. The term "lowest sustainable temperature," as is made more evident below, refers to a steady state inlet temperature derived by conutercurrent heat exchange with an efficient storage system. The installation is assumed, for purposes of description, to be operated under marginal light flux conditions, i.e. under conditions of weak or intermittent insolation, or both, and with relatively cold ambient temperatures. This represents a context placing stringent operative requirements on the system.

The collector structure 10 is here a rectangular configuration having a peripheral frame 16 within which are mounted a pair of transparent light transmissive panels or covers 18, 19. Although the panels 18, 19 may be of a synthetic polymer such as an acrylic or polycarbonate, particularly where high impact resistance or strength is needed, glass is most typically employed and these elements thus will be referred to hereafter as glass panels or covers of brevity. The two-glass structure is generally preferable for a cold environment, and anti-reflective coatings (not shown) may be employed to increase light transmission. The spacings between the glass panels 18, 19 are in accordance with conventional practice, and typically in the range of 2-7 cm. The uppermost (or second) panel 18 is firmly seated and sealed around its periphery within the frame 16 to prevent air leakage.

The collector panel 20 itself, upon which the incident radiation impinges, comprises a thin generally planar sheet of material, such as alunimum or high temperature plastic, and a light absorptive black (selective coating) upper surface. The thickness of the panel 20 is of importance, being less than approximately 0.5 mm, and typically about 0.2 mm for aluminum material. Thus, there is good heat transfer with an associated fluid flowing along the under side of the panel 20 and relatively poor heat transfer in the collector material along the length of the collector panel 20 in the direction of mass flow. Consequently, the panel 20 can be said to have anisotropic characteristic in the sense that heat transfer occurs in the direction of the adjacent fluid rather than along the panel. Although anisotropic thermal conductivity materials are known, their use is not considered particularly advantageous because of the low cost and widespread availability of thin metal (e.g. aluminum) sheeting. High thermal conductivity is not required, because good thermal interchange with the air mass flow can be achieved even with a relatively poor conductor, such as one of the plastics (e.g. "Lexan") used in thin walled plastic heat exchangers. It will also be appreciated that the upper surface of the collector panel 20 can incorporate a high absorption efficiency, low emissivity ("selective") coating, of one of the materials now currently available.

The collector panel 20 has longitudinal side edges defined by upwardly angled flanges 22, 23, a first flange 22 being coupled with an air-tight seal to the adjacent edge of the closest glass panel 18. The other side flange 23 terminates in a lip 25 which is spaced apart from the facing edge of the first glass panel 18, and defines an aperture in which is inserted an air permeable spacer 27, comprising a fibrous porous filter element which provides a flow path restriction. Both longitudinal side edges of each of the collector panel 20 and first glass panel 18 rest within receiving channels 28, 29 in the sides of the frame structure 16, and permit air to pass about the longitudinal side edges in reentrant fashion in going from the upper side of the first glass panel 18 to the under side of the collector panel 20.

The collector panel 20 also includes a multiplicity of bypass flow apertures 30 spatially distributed across a portion of the collector panel 20 surface. The flow apertures 30 are asymmetrically distributed relative to the direction of air mass flow, and are concentrated at the hotter portions of the collector panel surface, adjacent the outlet conduit system. It is advantageous to form a part of the outlet conduit 14 directly as a channel 32 in an insulative back plate 34 for the frame structure 16, the channel 32 in this example lying in the mid region of the collector plate 20 and parallel to the longitudinal side edges. The insulative back plate 34 has a relatively small spacing from the under side of the collector plate 10, the thickness ($t$) of this spacing for the air mass flow being of the order of 3 mm or less, in accordance with considerations discussed in greater detail hereafter.

The inlet conduit 12 feeds inlet air, in this example, into the region between the first and second glass panels 18, 19 respectively. An outlet temperature sensor 36 disposed in the outlet conduit 14 provides signals to a servo system 38 which controls a variable speed D.C. motor 40 driving a blower 41 coupled in an air recirculation path 42 including an air filter 44. No detailed example of a servo system 38 is given, because of the widespread availability of systems of different complexity, and because the system may also be operated under manual control, particularly under substantially constant conditions. Advantageously, however, a servo system 38 is employed to vary the mass flow rate so as to tend to maintain the outlet heated air temperature at a selected value or within an optimum range. With a recirculating air system, external impurities cannot enter, and an air filter 44 may not be required. While it is desirable to provide adequate sealing to limit heat losses, it is not necessary to have a completely closed system. Under certain circumstances and in different systems the collector 10 may simply receive exterior or room ventilation air at ambient outside or inside temperature, through an inlet valve 46, and in such mode the air filter 44 is particularly useful in filtering out impurities, and may be disposed in the inlet conduit.

Within the recirculation path 42, a low thermal mass heat exchanger 50 of the countercurrent type is disposed to provide heat exchange with a counterflowing liquid, typically water, such as is described in previously issued U.S. Pat. No. 3,882,934, entitled "Heat Exchanger" to Stellan Knöös et al. This patent discloses and claims a compact heat exchanger structure that also provides a high heat transfer flux, a low thermal mass, and a low pressure drop. Heated air in the recirculation path 42 is passed in one direction through the heat exchanger 50, which is indicated only schematically. The water flow in the other direction is in a water recirculation path 52 which can also receive inlet water at ambient temperature. A water circulation pump 54 is controlled by a variable speed D.C. motor 56 which is here electrically interconnected to the blower motor 40 so as to recirculate the water through the heat exchanger 50 with substantially equal enthalpy flow rates $c_p \dot{m}$ between the air and water. A temperature sensor 56 coupled in the water outlet line from the heat exchanger 50 provides a signal to comparator circuits 58.

The water recirculation path 52 for the water includes a sequence of (four) thermally insulated water storage vessels 62, 63, 64 and 65. The vessels 62–65 are arranged to provide a hierarchy of temperature levels, with the first vessel 62 storing the highest level liquid and the temperatures decreasing progressively down to the fourth vessel 65 which stores the coldest level. Restricted passageways 67 interconnect the vessels in series, and the outlet line 69 from the system is taken from the first storage vessel 62, while the fourth storage vessel 65 provides a return to the circulation pump 54. The number and size of the vessels and the number of temperature gradations utilized are dependent upon design factors for a particular application, but principally pertain to the desired final temperature for the water and the average water flow rate. The passageways 67 and the outlet line 69 are typically insulated (not shown). Temperature sensors 70 including transducer elements (not shown in detail) in thermal interchange relation with the contents of the vessels 62-65 also provide output signals to the comparator circuits 58.

A selector valve 72 in the path of heated water from the heat exchanger 50 selectively directs the water, depending upon its temperature level, into the first, second or third storage vessels 62, 63, 64 respectively, through individual conduits 74, 75, 76 respectively via the interconnecting passageways 67. In the example shown, the selector valve 72 and comparator circuits 58 essentially comprise a thermostat arrangement in which the highest level reached controls the conduit to which the water is directed. The circuits 58 compare the temperature of the heated water to the different levels maintained at the storages, and controls the selector valve 72 accordingly. A wide variety of analog and digital techniques are available for controlling the direction of water flow dependent upon temperature, and more complex schemes need not be described here. It should be noted, however, that the injection of heated water into individual ones of the storage vessels could be controlled in substantially more advanced fashion through the use of modern digital data processing techniques. Such techniques make feasible the determination of optimum flow paths under both transient (e.g. starting) and steady state conditions.

In the operation of the system of FIG. 1, a pressure differential between the inlet conduit 12 and the outlet conduit 14 for each of the collectors 10 is established by the fan 41. Then, referring to FIGS. 1-3 particularly, cold air is injected into the volume between the glass panels 18, 19 to provide a total mass flow (at an inlet pressure $p_o$) which distributes throughout the interior volume between the glass panels. At the longitudinal side edges of the first glass panel 18, in the spacing from the side channels 28, 29, the air flows about the edges, under the side flanges 22, 23 of the collector plate, and then under the collector plate 20 itself in the direction of the central channel 32 in the insulative back plate 34. This flow path is referred to as the "principal" flow path even though the bypass flow discussed hereafter may vary within a substantial range for different applications, because the under side flow represents the heated air mass, and because the other flow components subsequently rejoin the principal air flow.

Some heating of the air mass takes place in the volume between the first and second glass panels 18, 19, but the principal heating takes place as the air mass moves under and in thermal interchange relation with the collector plate 20. Upon reaching the longitudinal outlet channel 32, the heated air is then passed from the outlet conduit 14 into the path to the heat exchanger 50. Concurrently, the other of the dual flow paths is established by the bypass flow through the air permeable spacer 27 along one longitudinal side edge of the collector plate 20. The bypass flow (now at stagnation pressure $p_\infty$) is thereby restricted and moves transversely relative to the longitudinal axis toward the arrays of bypass flow apertures 30 on each side of the central region of the collector plate 20. Under the suction exerted by the apertures 30 the bypass flow develops localized flow components which are at least partially angled relative to the plane of the collector plate 20, i.e. at an angle approaching the normal to that plane. The localized flow components then pass through the apertures 30 to join the principal flow path at the under side of the collector plate 20. This dual flow path arrangement effectively inhibits the development of any cellular motion in the heated volume above the collector plate 20. Stabilized circulating toroidal cells of the type described by Bénard cannot exist because of the spatially distributed bypass flow components. Thus the significant losses that can occur from natural convection are effectively suppressed.

There is a small increase in re-radiation losses, as is described in more detail below, but these are much more than compensated for by the other benefits of the system. The continuous bypass flow in the hotter regions of the collector plate 20 nearest the outlet channel 32 extracts thermal energy that may be entrapped between the collector plate 20 and the first glass panel 18, but the bypass flow remains at substantially constant temperature until the flow components curve in the direction toward the plane of the collector panel 20 and begin to be heated by that surface. In this region, however, the increase in temperature is rapid. Another substantial benefit of the dual path collector lies in the fact that it enables either a reduction in the number of light transmissive panels, or more efficient utilization of existing panels.

Figure 4:
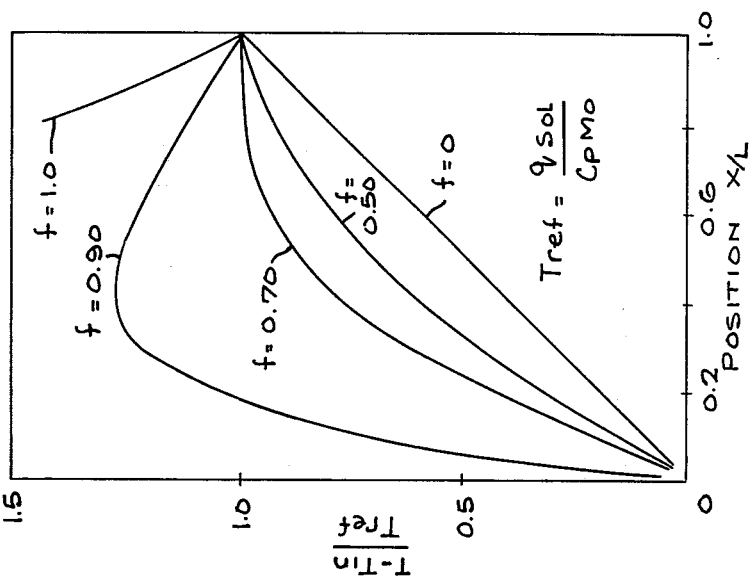
FIG. 4 is a graphical representation of surface temperature distribution along the length of the collector for different bypass conditions, useful in the description of the system.

The following analysis is intended to enable a better appreciation of the manner in which the dual path principle is most effectively utilized for a particular application. Reference should be made to FIG. 4 in which shows generalized fluid temperature profiles versus position X/L along the absorber (collector plate) surface, with the 0.0 and 1.0 positions representing the fluid inlet and outlet respectively, and with the variable parameter comprising the bypass (dimensionless) fraction $f$ (wherein $f = 0$ constitutes zero bypass flow and $f = 1$ constitutes a 100% bypass flow). In this generalized case the effects of convective and radiative losses and heat conduction along the absorber are assumed to be zero, and there is assumed to be an even distribution of bypass flow through a large number of similar apertures. There is then a linear fluid temperature profile when $f = 0$, because there is very effective "wetting" of the air by the collector plate and laminar flow in the narrow channel beneath the collector plate, so that there is a substantially linear thermal gradient along the collector plate. There is a corresponding thermal gradient along the air mass flow, with a small, average temperature difference that is directly proportional to the channel height $t$ under the collector plate. As the bypass flow increases ($f$-number becomes larger) the temperature profile becomes convex (negative second derivative) with higher fluid temperatures existing in the mid region along the collector plate although the same fluid outlet temperatures in this generalized case. The extent of the curvature is representative of the mid region heating effect of the collector plate which is the source of the weak radiative loss penalty previously mentioned. FIG. 4 demonstrates that, in order to provide an adequate bypass effect on the one hand while avoiding substantial temperature overshoot on the other, the $f$ value should be in the range of 0.25–0.75. It will be noted that the condition in which $f = 1$ corresponds to the known type of system in which the absorber comprises a distributed permeable mass (steel chips or steel wool), and that, as shown in FIG. 4, regions of excessive absorber surface temperature, much higher than the fluid outlet temperature, thereby exist.

A number of other considerations also apply to the layout and usage of the perforation pattern. For a given application, and particularly for high performance collectors, the perforation distribution (holes per unit area), the individual hole size (constant or variable), the mass flow rate, the fluid viscosity, the temperature to be attained and the channel geometry should be considered. However, the insertion of a flow restriction somewhere in the bypass flow effectively reduces the criticality of the aperture relationships and any tendency to clogging with particle matter.

In order to select hole size and the number of holes per unit area for a specified $f$-value, the following relationships should be observed. For the case of equal circular holes of diameter $d$, an even distribution of N holes per unit area, and the fluid (air) inlet pressure $p_o$ being equal to the fluid stagnation pressure $p_\infty$ above the collector surface, the following relations approximately hold true $$\beta = [1 - (1-f)^{\frac{1}{3}}]^{-3} \tag{1}$$

$$\beta = 2.43 \, C_D(Re_n, Re_t) \frac{t^3}{d_n^4 L^2 N^2} \frac{\dot{m}_0}{\mu} \tag{2}$$

where
$\beta$ = a dimensionless parameter
$C_D$ = a dimensionless pressure loss coefficient depending upon the average Reynolds number $Re_n$ for the flow through the hole, and average $Re_t$ for the channel flow beneath the absorber plate
$t$ = channel height (planar flow)
$L$ = channel length
$\dot{m}_0$ = overall mass flow rate per unit absorber area
$\mu$ = average fluid viscosity For a given desired $f$-value, $\beta$ can be determined from the first of the above equations. The proper relation between $d_n$, N, $t$, L, $\dot{m}_0$ and $\mu$ are then given by the second equation.

For a specific example, $f = 0.5$, the individual circular hole diameter is $d_n = 0.5 \times 10^{-3}$m, the number of holes N = 2500/m², L = 0.25m, and $C_D$ = 2.0. Furthermore, the air mass flow rate is $\dot{m}_0 = 0.0050$ kg/s, and the viscosity $\mu = 2.08 \times 10^{-5}$ kg/ms. The proper channel height $t$ is to be determined. Using equation (1), we fine $\beta = 114.2$, equation (2) then gives the channel height $t = 1.3 \times 10^{-3}$m.

The corresponding viscous pressure distribution along the flow channel can be calculated from the equation $$p\left(\frac{x}{L}\right) - p_o = \frac{\phi}{4} \frac{(1-f)^{4/3}}{1-(1-f)^{1/3}} \left[\left(1 + \frac{x}{L} \frac{1-(1-f)^{1/3}}{(1-f)^{1/3}}\right)^4 - 1\right] \tag{3}$$

where $$\phi = \frac{12\mu \, \dot{m}_o L^2}{\rho t^3} \tag{4}$$

Here $\rho$ is the average gas density. Inserting $x/L = 1$ the total viscous channel pressure difference can be calculated.

A closely interrelated aspect, for weak insolation conditions particularly, pertains to the heating time constant of this system. With air as the heat transfer fluid, and a flow channel width of 1 mm, the principal flow path entraps approximately $10^{-3}$ kg of air per square meter of collector area. The characteristic rise time from insolation for the air alone is of the order of 0.1 sec/° K. The very thin absorber panel of 0.2 mm aluminum sheet provides a short time constant rise for a given amount of insolation. In contrast to a solar water heating system, in which both the collector and the water mass must be heated, in which approximately 20 minutes are needed for a temperature rise of approximately 50° C., collector systems in accordance with the invention have a very rapid response time for the same temperature rise of the order of 1 minute, or much more than an order of magnitude faster. The thickness $t$ of the air mass flow layer at the under side of the collector plate 20 is simply expressed when the channel is essentially rectangular in cross section. The preferred range for this thickness $t$ under these conditions is 0.5–2.0 mm. However, for a mass flow channel which is not of rectangular geometry, it is more appropriate to speak of the hydraulic diameter ($D_n$), expressed as:

$$D_n = 4 \times \text{cross sectional area/perimeter} \tag{5}$$

where the flow is in a rectangular channel, $D_n = 2t$, so that it can be seen that preferred values for $D_n$ are 1.0–4.0 mm. While it is evident that specialized surfaces or configurations may be utilized to give improved heat transfer characteristics, it is also evident that major differentials in the thickness $t$ along the flow path are generally not useful.

The fast time constant of the present system is enhanced by the use of a low thermal mass, high efficiency heat exchanger 50. The minimum entropy storage system, however, provides a further advantage whether or not maintenance of a fast response time is desirable for a particular application. Under optimum conditions of insolation, the watr outlet temperature from the heat exchanger 50 is at a maximum, so that the selector valve 72 would be shifted to inject the hot water into the first storage vessel 62, from where it could be distributed to associated utilization devices (not shown). By use of the temperature sensor 36 and control of the air mass flow rate by the fan 41, thermal energy output in the heated air to the heat exchanger 50 can be maximized, or if desired temperature level could be maximized to a certain extent. With a matching steady state enthalpy flow rate for the recirculating water, an optimized output is supplied to the storage vessels 62-65. A diminution in water temperature shifts the selector valve 72 to the conduit 75, injecting the heated water into the second storage vessel 63, or similarly into the third storage vessel 64. The fourth storage vessel serves as a buffer between the heated fluids and the ambient inlet temperature, and the restricted flow passages 67 permit maintenance of internal temperatures and pressures within the individual storage vessels without substantial thermal interchange. Because the inlet water for the heat exchanger 50 comes either from this coldest region or from ambient temperature sources, the potential of the counter-flow exchanger is most effectively utilized. The inlet air temperature in the recirculation path 42 may be said to be at its lowest sustainable temperature, permitting maintenance of the thermal gradient along each collector 10 enhancing efficiency. The expression "lowest sustainable temperature" means that under steady state conditions, considering losses, the system tends to seek an air inlet temperature as close to ambient as conditions will permit. Thus thermodynamic irreversibility is minimized throughout the system, in contrast to existing systems in which an insolation heated fluid may come in contact with a fluid which is actually of substantially lower temperature during the entire heat exchange.

Figure 5:
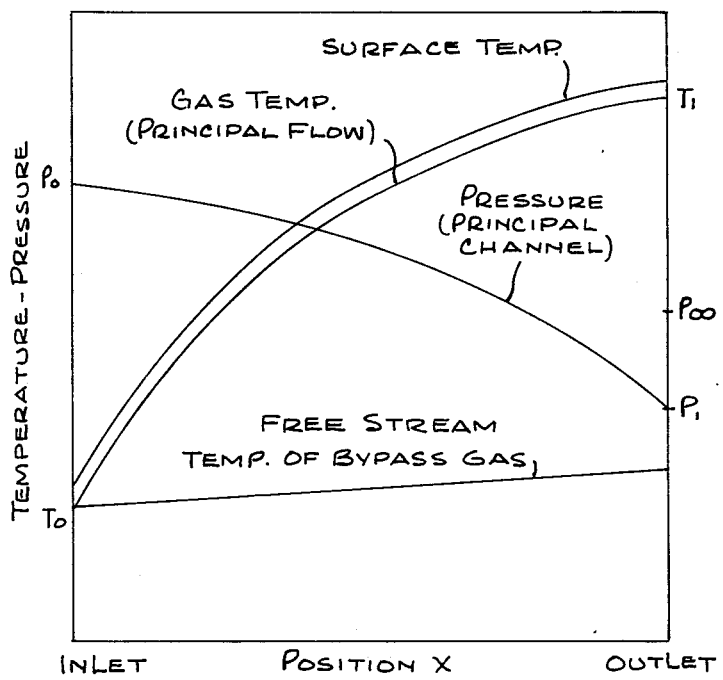
FIG. 5 is a graphical representation of pressure and temperature variations along the length of a collector system in accordance with the invention.

A generalized and somewhat idealized depiction of the temperature and pressure conditions in the system of FIGS. 1-3 is shown in FIG. 5. Only relative magnitudes are given, and the conditions shown illustrate a chosen $f$-value of approximately 0.30. In FIG. 5, the pressure in the principal channel varies along the length of the collector from an inlet pressure $p_o$ to an outlet pressure $p_1$. The stagnation pressure $p_\infty$ in the region above the collector panel is determined by the restriction in the flow channel and is somewhere between these values. Along the length of the collector panel, the surface temperature follows a temperature gradient with an upward convex characteristic, and the gas temperature has a substantially like curvature but is displaced by a substantially constant temperature differential. The free stream temperature of the bypass gas, on the other hand, increases only slightly along the effective length of the heat exchanger. This statement must be qualified by the understanding, however, that when the bypass gas enters the region adjacent the surface of the collector panel, when the bypass flow components are about to enter the apertures, the bypass gas thereupon increases in temperature.

A number of exemplifications of the invention utilizing the dual path concept are available, as shown in FIGS. 6-8, to provide particular structural, economic and operative advantages. In addition to the low cost and light weight of a thin collector plate sheet, it is also readily feasible to perforate hole patterns in any of a wide variety of configurations, and to control the dual air flow paths with simple mechanisms. An example of a particularly low cost structure is shown in FIG. 6, in which the collector plate 20a is mounted within a peripheral frame member 16a and is seated at its longitudinal side edges in the frame, along with a single glass cover plate 18a. The insultive backing plate 34a for this structure may comprise a single element, integral with the sides of the frame 16a if desired, and the entirety of this unit may be molded of one piece of rigid foam. Inlet air flows are provided by a group of three longitudinal channels 76, 77, 78 in the backing plate member 34a, two of these channels 76, 78 respectively being along the longitudinal side edges of the collector plate 10a, and the intermediate channel 77 being along the approximate central longitudinal axis. Intermediate this central channel 77 and each of the different side channels is disposed a substantially longitudinal hot outlet channel 80, 81 respectively. Projections (not shown) of insulative material may be molded into or fixed to the surface of the backing plate 34 to maintain spacing of the collector panel 20a. An equivalent function would be provided by dimples or other small surface area depressions in the collector panel 20a itself.

The perforation patterns in the collector panel 20a comprise a pair of sets or arrays of bypass flow control orifices 85, 86 respectively on each side of the central cold inlet channel 77. The control orifices 85, 86 provide openings sufficiently large to supply a spatially distributed flow from the central region in each direction outwardly toward the adjacent hot outlet on each side. Arrays of bypass flow apertures 30 are disposed on each side of each hot outlet channel 80, 81 again being asymmetrically disposed on the heat transfer surface of the collector plate 20a with respect to the heat exchange length, so as to be concentrated on the hotter portion of the heat exchange length.

In this example, the solar energy collector plate 20a provides four different principal flow paths, and two pairs of bypass flow paths extending transversely inwardly toward the hot outlets 80, 81 from the interspersed cold inlet channels 76-78 respectively. The larger control orifices 85, 86 are selected in size, number and disposition to determine both the stagnation pressure $p_\infty$ above the collector plate 20a, and the proportion of bypass flow, or $f$-number. As viewed in FIG. 6, the flow from the central region through the lefthand set of flow control orifices 85 proceeds across and partially through the closest adjacent set of bypass flow apertures 30, and the remainder of the bypass flow proceeds across the region above the hot outlet 80 and into the set of bypass flow apertures 30. The relative flows through the two sets of apertures 30 can be adjusted by slight changes in the size or density of the apertures. Similarly, on the righthand side of the collector plate 20a as viewed in FIG. 6 a similar bypass flow function is provided.

This arrangement has the advantages of simplicity, efficiency and low cost. It should be noted that no bypass flow control orifices are used in the region of the inlet channels 76, 78 adjacent the longitudinal side edges to permit air to be forced up in these regions into the space above the collector plate 20a. If this were done, there would be substantially equal and opposite flows which would meet above the hot outlet channels 80, 81, creating a region of stagnant air which might give rise to the cellular motion condition and substantially increase free convection losses.

In the system of FIG. 7, similar asymmetrical bypass flow is employed, together with a different technique for injecting the cold inlet air into the region underneath the collector plate 20b. In this arrangement, the first glass panel 18b is coextensive with only a central portion of the collector plate 20b, being supported on longitudinal frame channel members 88, 89 from the collector plate 20b. One channel member 89 only includes relatively large bypass flow control orifices 90 disposed along its length. The cold inlet 12b injects air in a direction transverse to the longitudinal side edges to pass into and fill the volume between the facing side surfaces of the collector panel 20b, the first glass plate 18b and the under side of the second glass plate 19b. Different patterns of relatively large flow diverting holes 91, 92 along each of the longitudinal side edges of the collector panel 20b permit a principal flow path to be established along the under side of the collector panel and transverse to the centrally disposed hot outlet channel 32b. The bypass flow rate and the stagnation pressure above the hot region of the collector plate 20b are determined by the bypass flow control orifices 90. The bypass flow from the inlet reverses direction and flows through the bypass flow apertures 30 as previously described. This arrangement provides a two-glass system, but saves glass by disposing it only in the region of the hot surfaces, and is of high efficiency because the cold inlet air effectively sweeps across the entire volume under the outermost glass plate 19b while also maintaining a constantly moving air flow under the innermost glass panel 18b.

In the exemplification of FIG. 8 the technique of FIG. 7 is extended in a different way, along with providing a different flow control configuration. Here, arrays of flow diverting holes 91 are disposed along each longitudinal side edge and along the central region, so that principal air mass flows move in each transverse direction toward a pair of longitudinal channels 80, 81 providing hot outlet flows as in FIG. 6. The inner glass plate structure, however, comprises a pair of tilted glass plates 18c which are coupled at one longitudinal edge directly to the collector plate 20c, and which are held spaced apart along their other longitudinal edge by an angled panel 93. A permeable spacer 94 interposed between the panel 93 and the facing longitudinal side edge of the glass plate 18c provides the desired bypass flow restriction and pressure reduction.

In the arrangement of FIG. 8, the use of the different interior glass plates 18c over the hotter regions of the collector plate 20c both establish the dual flow paths and provide a trapping and suppression effect for natural convection losses. In addition, the tilt angles of the interior glass plates 18c can aid efficiency by providing greater light transmissivity at higher tilt angles.

Figure 9:
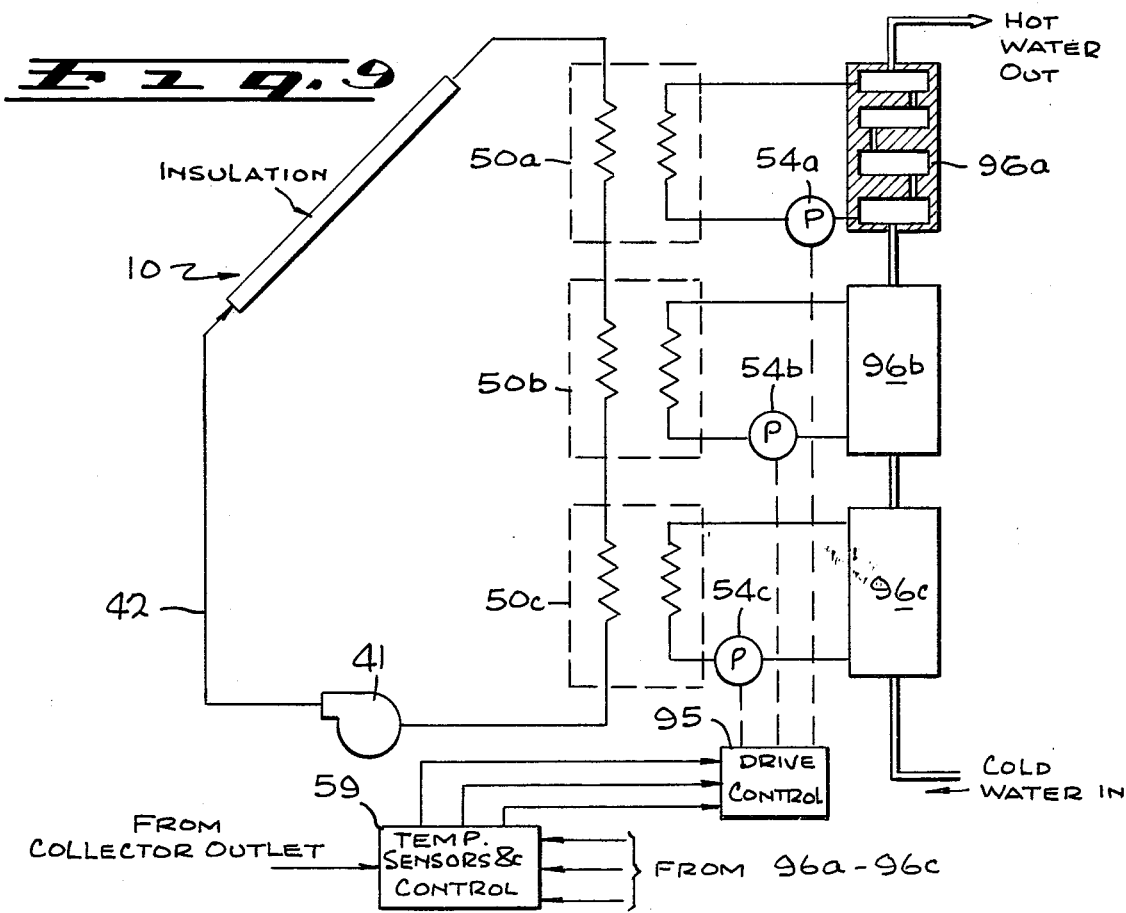
FIG. 9 is a block diagram representation of a different form of minimum entropy thermal energy storage system in accordance with the invention.

A different minimum entropy storage system is shown in FIG. 9, in which a comparable numbering system to that previously used is employed for ease of reference. Instead of a single counterflow heat exchanger, a series of three heat exchangers 50a, 50b and 50c is employed, each exchanger being disposed in conjunction with a different storage 96a, 96b or 96c respectively. As previously, the different storage sections 96a, 96b and 96c are interconnected by restricted conduits, but here each is arranged in a distinct recirculating path, including a pump 54a 54b or 54c respectively, with its different individual heat exchanger. As shown only for the high temperature storage section 96a, these may be multicompartmented bodies with thermal insulation between compartments, so that gradations of temperature level can be maintained within each individual recirculating loop. The pumps 54a–54c are individually driven by a control 95 which may comprise three individually operable drive motors or a single motor with actuable clutches. Temperature sensors and control circuits 59 may be arranged as in the system of FIG. 1, to compare the heated air temperature to the storage vessel temperatures, and to provide control signals to operate the pumps 54a–54c so as to select the initial heat exchanger section 50a, 50b or 50c with which heat transfer is to be effected.

In the operation of the system of FIG. 9, therefore, when there is good insolation on the collector 10 and a high level output temperature is generated with a good air mass flow rate, the heated air is directed first to the heat exchanger 50a for the highest level temperature storage section 96a, and then in series through the successive heat exchangers 50b, 50c, so that the air is again returned to the recirculation path to the inlet of the collector 10 at the lowest sustainable temperature. In its condition through the system, irreversible heat transfer is effected at each stage, and with the additional usage of countercurrent flow, a minimum entropy system is established. Where insolation is insufficient to generate an adequate high temperature level for the first storage vessel 54a, the first pump 54a is not driven, so that the heated air simply passes without significant heat loss to the next succeeding heat exchanger 50b. While this system entails the use of different heat exchangers and may use different pumps, it should also be recognized that it may be readily adapted to existing installations. For example, the lowest energy thermal storage 96c may comprise a swimming pool or other heat reservoir which requires only a relatively low temperature differential above ambient, and which already has its own pump.

Figure 10:
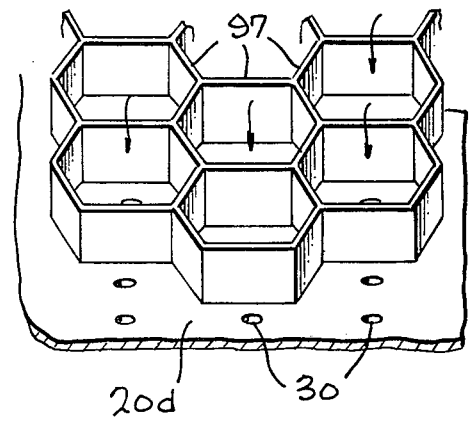
FIG. 10 is a fragmentary perspective view of a collector panel variation using a dual flow in conjunction with a honeycomb type of free convection suppressor.

FIGS. 10, 11, 12 and 13 demonstrate that the dual path concept is applicable to a wide variety of solar energy collection systems. Where high intensity solar radiation is generally present, as in a desert environment, natural convection losses can be prohibitively high, and honeycomb structures may not be fully effective. For such conditions, a honeycomb structure 97 disposed on a collector plate 10d may be used in conjunction with bypass flow apertures 30, as shown in FIG. 10. The honeycomb structure 97 is substantially transparent to incident radiation and is of a material providing low heat conduction. With bypass flow apertures 30 interspersed within the areas bounded by each of the cells of the honeycomb, the flow components transverse to the plane of the collector plate 20d act in contributory fashion with the honeycomb cells to supress natural convection losses and any tendency to form confined cellular flows.

Figure 11:
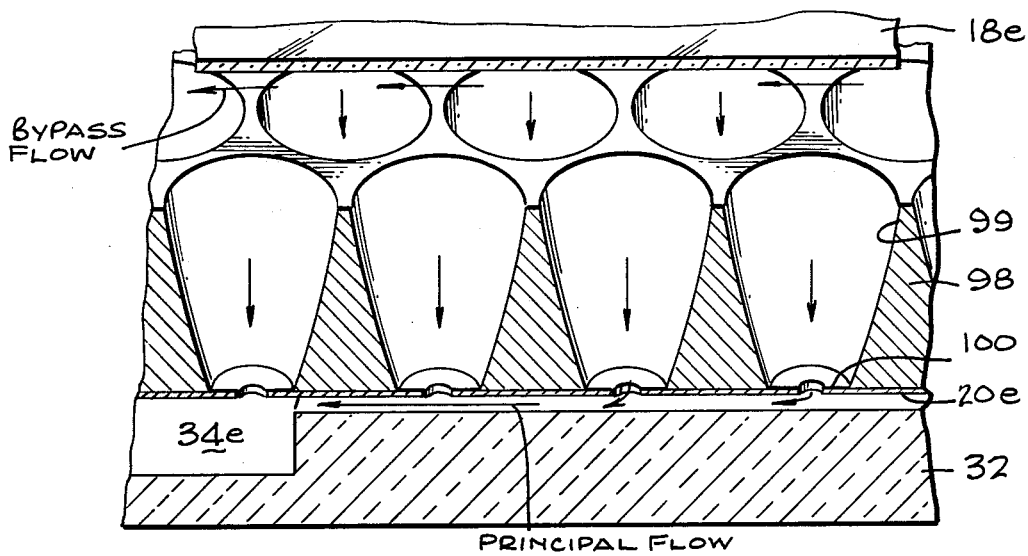
FIG. 11 is a side sectional view of a collector panel variation using a dual flow in conjunction with a radiation concentrator.

With reference to FIG. 11, it is often desired in solar energy collection systems to utilize some type of concentrator so as to provide a higher level of heated air temperature. Concentration of incident radiation, however, inherently is accompanied by the tendency to increase re-radiation and natural convection losses. The dual flow technique can be employed to particular advantage in such a system, one example being shown in FIG. 11. In FIG. 11, a collector plate 10e spaced apart from an insulative back plate 32 provides a principal under side flow to an outlet channel 34e for heated air. Beneath the glass cover 18e and above the upper side of the collector plate 10e, however, is disposed a radiation concentrator comprising an insulative matrix 98 incuding an array of concave reflectors of generally parabolic curvature and including interior reflective coatings. The concave reflectors 99 concentrate incident energy on a small area 100 at the bottom of the concavity. This heat absorbing area 100 of the collector plate 10e is preferably provided with one of the high absorptance, low emissivity coatings in order to limit re-radiation losses.

In addition, at least one bypass flow aperture 30 is disposed in the absorber area 100 so that bypass flow components are constantly drawn by suction within each of the concave reflectors 99. With the higher surface temperature in the absorber area 100, a greater proportion of the thermal energy generated in the outlet flow is contributed by the heating of the bypass flow components, but this arrangement provides a particularly useful technique for increasing the increment of heating of the air.

It will also be recognized by those skilled in the art that other concentrator schemes, such as a simpler V groove arrangement oriented with the longitudinal axis of the grooves in the East-West direction can also be utilized with the dual path concept. In addition, fabrication of the glass covers to provide a multiplicity of lens concentrators will also permit usage of the dual path concept with benefit. It will be evident that employment of these techniques ordinarily requires consideration of the acceptance angle, and that high concentration ratios may require that the collector structure be mounted to operate in a solar tracking mode.

Figure 12:
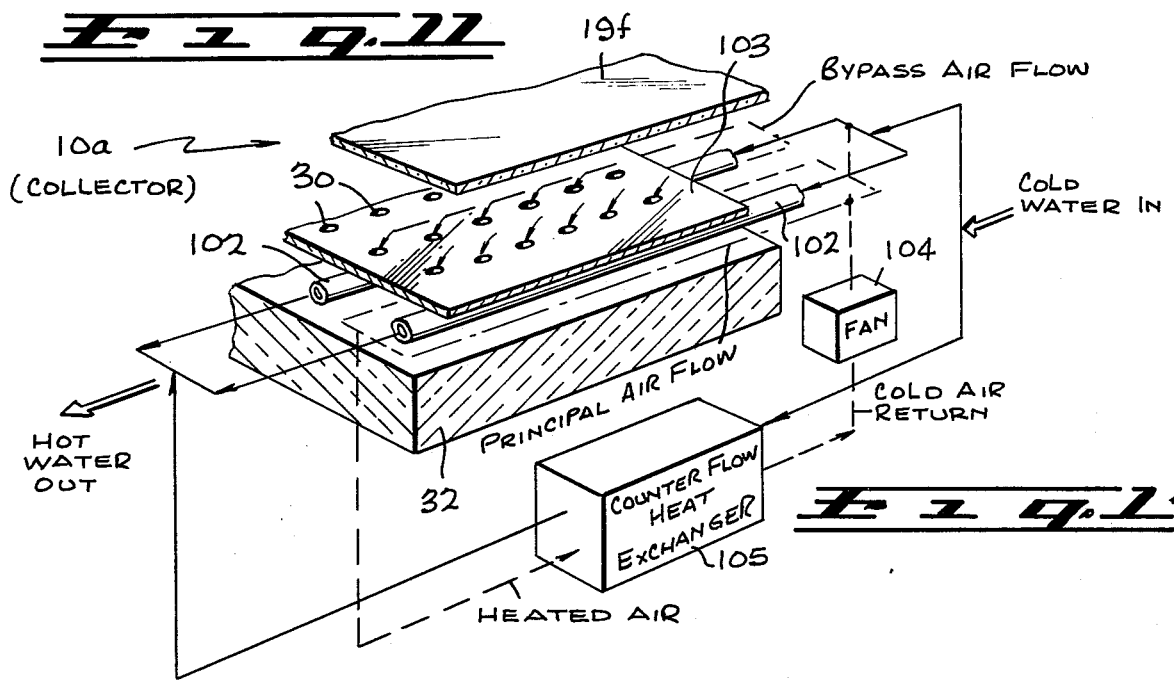
FIG. 12 is a fragmentary perspective view of a solar water heater collector panel in accordance with the invention.
Figure 13:
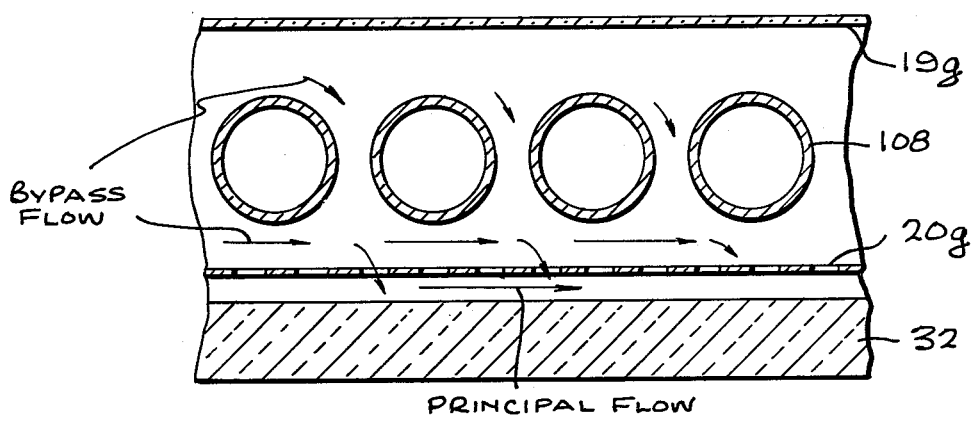
FIG. 13 is a fragmentary side sectional view of a collector system according to the invention that uses glass tubes above a collector panel surface.

Although the prior examples have described solar energy collection systems in which air is the initially heated fluid, FIG. 12 demonstrates that the dual path concept may effectively be utilized with a water heating system. In FIG. 12, a relatively thick collector panel 103 in a collector structure 10a is coupled in thermal interchange relation to water flowing in pipes 102, as is conventional with solar water heating systems. The pipes 102 are not embedded in the insulative backing plate 32, but are spaced apart by a sufficient distance for a principal air flow path to exist, under the collector plate 103. A bypass flow above the plate 103 passes through bypass flow apertures 30, at least in the volumes between the pipes 102, to suppress free convection above the collector plate 103. This system has a high performance capability, because the heated air can also be used to heat the cold water in a separate loop in which flow is governed by a fan 104. For this purpose the principal air flow at the hot outlet end of the collector 10a is returned through a counter-flow heat exchanger 105 through which a branch of the cold inlet water also flows in the opposite direction. The water heated by the exchanger 105 is combined with the water heated in the pipes 102, as output from the system. This system enables the benefits of the dual flow concept to be employed with a purely water heating system alone, or in combination with air heating.

There is a known type of solar energy collection system in which glass tubes may be disposed above the surface of a collector panel to permit the passage of incident radiation but to prevent escape of infrared radiation from the system. Such tubes have been used both with flat collector systems and concave light concentrator systems. In a dual flow path structure in accordance with the invention, referring now to FIG. 13, an array of spaced apart clear tubes 108 is disposed above the hotter regions of a collector panel 20g which also include bypass flow apertures 30 in this same region. The tubes 108 are typical clear glass fluorescent type tubes having, in this example, an approximately 40 mm outside diameter and an approximate 1 mm wall thickness (about ⅛ the thickness of single strength glass sheets). Being mass produced in great quantities for the lighting industry, such tubes are inexpensive but have relatively high strength. While open ended and air filled in the present example, they may be evacuated or an axial flow may be created with a blower if under given operating conditions substantial free internal convection currents are found to exist.

The tubes 108 over the hot regions of the collector plate 20g permit transmission of 75-85% of incident radiation but are heated both by incident radiation and by re-radiated infrared energy. However, using the dual flow arrangement, the bypass flow continually extracts this thermal energy while suppressing free convection losses at the surface of the collector panel 20g.

Although there have been described a number of variations and modifications, it will be appreciated that the invention encompasses all modifications and alternatives falling within the scope of the appended claims.

What is claimed is:

1. In a solar energy collection system of the fluid heating type having at least one transparent upper panel for limiting heat losses from an adjacent, lower, collector panel, the improvement characterized by means providing at least two major fluid flow paths relative to the collector panel, at least a first of the fluid flows being adjacent and in thermal interchange relation with the under side of the collector panel, and at least one other of the fluid flows having flow components at least partially angled toward the plane of the collector panel and intersecting with the first fluid flow.

2. The invention as set forth in claim 1 above, wherein said means provides dual fluid flows, the second of which flows is along the upper side of the collector panel and wherein the system includes means defining spatially distributed flow apertures in the collector panel, wherein the flow components angled toward the plane of the collector panel are directed through the flow apertures to join the first fluid flow.

3. The invention as set forth in claim 2 above, wherein said system further includes means defining inlet and outlet means for the fluid flows, means coupled to the inlet and outlet means for providing a pressure differential therebetween, and means disposed in the path of the second fluid flow for restricting the flow thereof.

4. The invention as set forth in claim 2 above, wherein the area of the flow apertures is such that the at least one other flow path comprises less than 75% of the total flow.

5. The invention as set forth in claim 4 above, wherein the flow apertures are asymmetrically disposed relative to the areal surface of the collector panel.

6. The invention as set forth in claim 4 above, wherein said means providing fluid flows comprises planar insulator means substantially coextensive with and spaced apart from the under side of the collector panel and where air is the fluid.

7. The invention as set forth in claim 2 above, wherein said collector panel comprises means flowing liquid in thermal exchange relation therewith.

8. The invention as set forth in claim 1 above, wherein said system further includes open cellular light transmissive means spatially distributed on the upper surface of the collector panel, and wherein the flow components that are partially angled to the plane of the collector panel define bypass flow components within at least some of the cells of the light transmissive means.

9. The invention as set forth in claim 8 above, wherein said cellular means comprises honeycomb means and said system includes aperture means disposed within the cells for providing the bypass flow components.

10. The invention as set forth in claim 1 above, wherein said system includes means disposed above said collector panel for concentrating incident solar radiation on selected areas of said collector panel, and bypass aperture means in said collector panel for providing the said at least one other fluid flow.

11. The invention as set forth in claim 10 above, wherein said means for concentrating radiation comprises insulative means including means defining an array of reflecting concavities therein.

12. The invention as set forth in claim 1 above, wherein said system includes an array of tubular light transmissive means spatially distributed adjacent the upper surface of said collector panel.

13. A solar energy collector system for efficiently utilizing incident radiant energy comprising:
 a collector element including radiant energy absorptive means on the upper side thereof;
 at least one planar light transmissive means disposed adjacent but spaced apart from the upper side and defining a fluid flow path adjacent the upper side of the collector element;
 planar insulating means disposed adjacent and spaced apart from the lower side of the collector element for defining a heating fluid flow path therebetween; and
 integral means disposed in conjunction with the collector element for establishing a free convection suppression flow of fluid relative to the upper side of the collector element.

14. The invention as set forth in claim 13 above, wherein said collector element includes a plurality of spatially distributed apertures therethrough defining the integral means for establishing a free convection suppression flow.

15. The invention as set forth in claim 13 above, wherein said system further includes means coupled to provide a suction for the heating fluid flow and the free convection suppression flow.

16. The invention as set forth in claim 14 above, wherein the free convection suppression flow is less than 75% of the total fluid flow.

17. The invention as set forth in claim 16 above, wherein the apertures are non-uniformly distributed across the face of the collector element and are substantially concentrated in the hottest regions of the collector element.

18. A solar energy collector system comprising:
 a collector element having a light incident side and a back side heated by the incident light energy and including a minor proportion of area defining spatially distributed apertures therethrough; and
 means disposed adjacent the collector element for defining a major reentrant air flow path extending along the light incident side of the collector element and then along the back side of the collector element, whereby a minor flow exists in the direction toward the collector element on the light incident side to limit free convection losses thereat.

19. A radiant energy collection system comprising:
 a collector panel having a radiant energy absorbing upper face and a heat transferring lower face;
 means disposed adjacent said panel for providing a partially restricted air flow path adjacent the upper face and a substantially laminar air flow path adjacent the lower face; and
 means intercoupling the partially restricted air flow path and the laminar air flow path with a plurality of spatially distributed flow paths at an angle to the faces of the collector panel, whereby free convection adjacent the upper face is suppressed.

20. A solar energy collection system comprising:
 an apertured collector panel;
 means providing a principal air flow under said collector panel concurrently with a bypass air flow through the apertures thereof;
 and liquid conduit means in thermal interchange relation with said collector panel.

21. The invention as set forth in claim 20 above, wherein the bypass air flow passes along a part of the upper side of the collector panel before diverting through the apertures to join the principal air flow, wherein the system additionally includes counterflow heat exchanger means, and means for directing heated air from the principal air flow through said heat exchanger means in counterflow relation to unheated liquid.

22. A solar energy collector system comprising:
 a heat collector having an anisotropic heat transfer characteristic, with substantially lower heat transfer in a direction along the plane than to an adjacent fluid medium, the collector having a light absorptive surface;
 an insulating member disposed adjacent and parallel to the heat collector and spaced apart therefrom in coextensive relation on the opposite side from the radiant energy absorptive surface by a distance sufficiently small that a fluid flowing therebetween in thermal exchange relation with the collector is substantially uniformly heated in the direction therebetween with a small temperature differential relative to the temperature of the adjacent position on the collector; and
 means for feeding a fluid to be heated into the collector-insulating member space at a temperature substantially below that to which the collector heats the fluid, whereby a thermal gradient exists in the heat flow direction along the collector arising from the anisotropic heat transfer characteristic.

23. The invention as set forth in claim 22 above, wherein said collector comprises a thin heat conductive sheet.

24. The invention as set forth in claim 22 above, wherein said heat conductive sheet is less than about 0.5 mm in thickness, wherein the space between the collector and insulating member has a hydraulic diameter $D_n$ of 1.0 to 4.0, and where the fluid is air.

25. The invention as set forth in claim 22 above, wherein the space between the collector and insulating member is substantially rectangular and between 0.5 mm and 3.0 mm, and wherein said collector system further comprises light transmissive means coextensive with but spaced apart from the absorptive surface of said collector, and said means for feeding a fluid includes means defining a flow path extending at least partially between the space between the light transmissive means and the collector to effect convective heat transfer therein.

26. A solar energy collector comprising:
 a thin sheet of material having a radiation absorbing surface on one side and a limited longitudinal heat conduction along its length such that a substantial temperature differential can exist along the length, the sheet including bypass flow apertures in at least a portion thereof;
 means defining a laminar fluid flow path adjacent the side of the sheet opposite the radiation absorbing surface and along the length of the sheet, the fluid flow path being of a thickness to provide a low temperature differential relative to the sheet; and fluid supply means providing fluid at a low mass flow rate to the means defining fluid flow paths on both sides of said sheet and through the apertures therein, the inlet fluid being at a substantially lower temperature than the sheet temperature when exposed to solar energy.

27. The invention as set forth in claim 26 above, wherein said thin sheet is of heat conductive material of less than 0.5 mm in thickness, wherein said means defining a fluid flow path comprises a planar insulating member disposed in facing relation to said sheet, and the spacing therebetween is of less than 3 mm in thickness.

28. The invention as set forth in claim 27 above, wherein the bypass apertures provide less than 75% of the total fluid flow.

29. The invention as set forth in claim 28 above, wherein the bypass apertures are asymmetrically distributed across the area of said sheet and are concentrated at the hotter regions of said sheet.

30. The invention as set forth in claim 29 above, wherein the sheet is aluminum of approximately 0.2 mm or less in thickness.

31. The invention as set forth in claim 26 above, wherein said system further comprises means for recirculating the fluid, and means for lowering the inlet fluid temperature to the lowest sustainable temperature relative to ambient.

32. The invention as set forth in claim 31 above, wherein said mens for lowering the inlet fluid temperature comprises countercurrent heat exchanger means coupled to said means for recirculating the fluid, and wherein said system further includes means for flowing a fluid to be heated in countercurrent relation to the recirculating fluid.

33. A solar energy collector system comprising:
collector panel means having longitudinal side edges and an upwardly facing radiant energy absorbing surface, said panel means including spatially distributed first aperture means;
frame means coupled to support said collector panel means and including an insulating surface member substantially coextensive with and spaced apart from the under side of said panel means, said frame means including at least one outlet conduit means longitudinally disposed along the under side of said panel means;
at least one light transmissive panel means spaced apart from and substantially coextensive with said collector panel means adjacent the upper side thereof;
means including an air inlet means for establishing a first air flow path for inlet air extending under said collector panel means to the outlet conduit means; and
means for establishing a bypass air flow for inlet air extending across at least a portion of the upper portion of said collector panel means and through the aperture means therein to the under side thereof.

34. The invention as set forth in claim 33 above, wherein the system includes in addition means for restricting the bypass flow such that a pressure differential exists between the bypass air flow and the first air flow, which is at relatively lower pressure than the bypass air flow.

35. The invention as set forth in claim 34 above, wherein said air inlet means are disposed to provide inlet air to above at least one light transmissive panel means, wherein said collector panel means are configured in relation to said frame means to provide a first air flow about the longitudinal side edges of said collector panel means, and wherein said outlet conduit means are centrally disposed along said panel means such that the air flows transversely in from both longitudinal side edges of said collector panel means to the outlet conduit means under said collector panel means.

36. The invention as set forth in claim 35 above, wherein said light transmissive panel means comprises a pair of spaced-apart panels, wherein said air inlet means is disposed to inject inlet air between said light transmissive panels, wherein said collector panel means is joined to the closest adjacent light panel means along one longitudinal side edge, and configured to define an inlet aperture along the other longitudinal side edge, and wherein the means for restricting the bypass flow comprises air pervious flow restricting means disposed in the space along the longitudinal side edge between said collector panel means and the adjacent light panel means.

37. The invention as set forth in claim 36 above, wherein the spatially distributed aperture means comprise aperture patterns disposed on each side of the outlet conduit means and relatively closer thereto than to the longitudinal side edges of the collector panel means and wherein the bypass flow extends transversely from the one longitudinal side edge of the collector panel means both through the closest adjacent apertures and across the central region of the collector panel means to the furthest disposed apertures.

38. The invention as set forth in claim 33 above, wherein said system includes means defining longitudinally disposed and spaced apart air inlet means and air outlet means under said collector panel means, and wherein said system further includes means communicating through said collector panel means for establishing a bypass flow above at least a portion of said collector panel means.

39. The invention as set forth in claim 38 above, wherein said means for establishing a bypass flow comprises second aperture means in said collector panel means, said second aperture means providing flow paths of substantially lower impedance than the spatially distributed first aperture means, such that air flow from the inlet means goes upwardly through the second aperture means to the region above the collector panel means for returns downwardly through the spatially distributed first aperture means to the under side of the collector panel means.

40. The invention as set forth in claim 39 above, wherein said system includes longitudinal air inlet conduits along the longitudinal side edges and the center region of said collector panel means, and longitudinal air outlet conduits disposed intermediate the central air inlet conduit and each of the different longitudinal side inlet conduits respectively, wherein the second aperture means comprise patterns of a plurality of apertures on each side of the central inlet conduit, and wherein said first aperture means comprise sets of apertures on each side of each outlet conduit and closer to the associated outlet conduit than to the closest adjacent inlet conduit.

41. The invention as set forth in claim 33 above, wherein said light transmissive panel means comprises a pair of panel means, a first of which is coextensive with only a selected interior central region of said collector panel means, and the second and further spaced apart one of which is coextensive with substantially the entire collector panel means, wherein the spatially distributed first aperture means are under the first light transmissive panel means, and wherein in addition said system includes peripheral support means coupling said first light transmissive panel means to said collector panel means, and including aperture means along at least one side thereof for establishing bypass flow between the under side of said first light transmissive panel means and the upper side of said collector panel means.

42. The invention as set forth in claim 41 above, wherein said air inlet means provides air in the space between said collector panel means and said second light transmissive panel means, and wherein said collector panel means includes second aperture means disposed adjacent the longitudinal side edges thereof for providing a low impedance flow path from the air inlet means to the under side side edges of said collector panel means.

43. The invention as set forth in claim 41 above, wherein said first light transmissive panel means comprises at least one panel disposed at an angle of inclination relative to the plane of the surface of the collector panel means.

44. The invention as set forth in claim 43 above, wherein said system includes a pair of longitudinally disposed outlet conduit means adjacent the under side of said collector panel means, the first aperture means comprise spatially distributed aperture means in said collector panel means adjacent each one of said outlet conduit means, and tilted light transmissive panel means substantially coextensive with the areas of each of the different spatially distributed panels of aperture means, whereby bypass air flow and gas entrapment both suppress free convection losses in the volume between the upper surface of said collector plate means and the tilted light transmissive panel means.

45. A system for storing thermal energy collected from solar radiation, comprising:
solar energy collector means for heating a first fluid in response to incident insolation;
means coupled to the collector means for feeding the first fluid therethrough at an adjustable rate;
counterflow heat exchanger means coupled to the first fluid feeding means for effecting thermal energy transfer between the first fluid and a second fluid, and coupled to return the first fluid to said collector means;
means for feeding the second fluid to said counterflow heat exchanger means at a rate providing substantially matched enthalpies;
at least two serially coupled energy storage devices for storing the second fluid at different temperature levels;
flow diverter means receiving the second fluid from said heat exchanger means for controllably directing the second fluid into a selected branch point along the serially coupled energy storage devices;
and means responsive to the heating effect of the solar energy collector means for controlling the flow diverter means to direct the second fluid to a selected branch point in accordance with the level of heating thereof.

46. The invention as set forth in claim 45 above, wherein the first fluid is air and the second fluid is water, wherein said flow diverter means is coupled in a recirculating path receiving the second fluid from the coldest energy storage device such that flow of the first fluid into the collector means is provided at the lowest sustainable temperature, and wherein said means for controlling the flow diverter means is also responsive to the temperature levels of the energy storage devices.

47. The invention as set forth in claim 46 above, wherein said counterflow heat exchanger means comprises a single heat exchanger coupled between the lowest temperature energy storage device and the flow diverter means, wherein said energy storage devices comprise insulated chambers including limited flow intercouplings therebetween, wherein said means for feeding the first fluid is responsive to the temperature of the heated air, and wherein said means for feeding the second fluid is responsive to the first fluid rate.

48. A system for storing thermal energy collected from solar radiation, comprising:
solar energy collector means for heating a first fluid in response to incident insolation;
counterflow heat exchanger means receiving the first fluid in a first direction of passage through the heat exchanger means;
means for recirculating the first fluid through the collector means and heat exchanger means;
at least two insulated energy storage devices for storing a second fluid at different temperature levels, the energy storage devices being serially connected to provide a progressive hierarchy of temperature levels, the counterflow heat exchanger means comprising at least two serially coupled sections, each coupled to a different one of the energy storage devices and receiving the second fluid in a second direction of passage through the individual heat exchanger section;
pumping means coupling each different energy storage devices to its associated heat exchanger section in a recirculating loop; and
means responsive to the temperature of the heated first fluid for controlling the pumping means to initiate heat exchange in conjunction with a related temperature level of second fluid storage.

49. The invention as set forth in claim 48 above, wherein the first fluid is air and the second fluid is water, wherein the means for controlling the pumping means is also responsive to the temperature levels of the energy storage devices, and wherein the pumping means comprises individual pumps each associated with a different combination of energy storage device and associated heat exchanger section.

* * * * *

UNITED STATES PATENT AND TRADEMARK OFFICE
CERTIFICATE OF CORRECTION

PATENT NO. : 4,054,124
DATED : October 18, 1977
INVENTOR(S) : Stellan Knoos

It is certified that error appears in the above-identified patent and that said Letters Patent are hereby corrected as shown below:

Column 4, line 48, "generallly" should read --generally--. Column 5, line 4, "conutercurrent" should read --countercurrent--; line 19, after "covers" and before "brevity", "of" should read --for--; line 31, "alunimum" should read --aluminum--. Column 9, line 57, "fine" should read --find--. Column 10, line 58, "watr" should read --water--. Column 11, line 17, after "10" and before "enhancing", insert --and--; line 62, "insultive" should read --insulative--. Column 14, line 10, "condition" should read --conduction--; line 15, after "vessel" and before the comma (","), "54a" should read --96a--; line 57, "incud-" should read --includ- --. Column 19, line 29, "mens" should read --means--. Column 20, line 48, after "means" and before "returns", "for" should read --and--.

Signed and Sealed this

Eleventh Day of April 1978

[SEAL]

Attest:

RUTH C. MASON
Attesting Officer

LUTRELLE F. PARKER
Acting Commissioner of Patents and Trademarks